US011328182B2

(12) United States Patent
Gruber et al.

(10) Patent No.: US 11,328,182 B2
(45) Date of Patent: May 10, 2022

(54) THREE-DIMENSIONAL MAP INCONSISTENCY DETECTION USING NEURAL NETWORK

(71) Applicant: Microsoft Technology Licensing, LLC, Redmond, WA (US)

(72) Inventors: Lukas Gruber, Zurich (CH); Christoph Vogel, Zurich (CH); Ondrej Miksik, Dubendorf (CH); Marc Andre Leon Pollefeys, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 157 days.

(21) Appl. No.: 16/897,145

(22) Filed: Jun. 9, 2020

(65) Prior Publication Data

US 2021/0383172 A1 Dec. 9, 2021

(51) Int. Cl.
*G06K 9/62* (2022.01)
*G06K 9/00* (2022.01)
*G06N 3/04* (2006.01)
*G06N 3/08* (2006.01)
*G06T 19/00* (2011.01)

(52) U.S. Cl.
CPC ....... *G06K 9/6262* (2013.01); *G06K 9/00201* (2013.01); *G06K 9/6256* (2013.01); *G06N 3/04* (2013.01); *G06N 3/08* (2013.01); *G06T 19/003* (2013.01)

(58) Field of Classification Search
CPC ............. G06K 9/6262; G06K 9/00201; G06K 9/6256; G06N 3/04; G06N 3/08; G06T 19/003; G06T 2207/10028; G06T 2207/20081; G06T 2207/20084; G06T 2207/30168; G06T 7/0002
See application file for complete search history.

(56) References Cited

U.S. PATENT DOCUMENTS

| 2018/0350044 | A1* | 12/2018 | Ponto ...................... G06T 15/00 |
| 2019/0138786 | A1* | 5/2019 | Trenholm ................ G06T 7/50 |
| 2019/0362544 | A1 | 11/2019 | Pekelny et al. |
| 2020/0027262 | A1* | 1/2020 | Parra Vilchis ........ G06T 19/003 |

(Continued)

OTHER PUBLICATIONS

"International Search Report and Written Opinion Issued in PCT Application No. PCT/US21/025844", dated Jun. 24, 2021, 12 Pages.

(Continued)

*Primary Examiner* — Maurice L. McDowell, Jr.
(74) *Attorney, Agent, or Firm* — Alleman Hall Creasman & Tuttle LLP (57) ABSTRACT

A three-dimensional (3D) map inconsistency detection machine includes an input transformation layer connected to a neural network. The input transformation layer is configured to 1) receive a test 3D map including 3D map data modeling a physical entity, 2) transform the 3D map data into a set of 2D images collectively corresponding to volumes of view frustums of a plurality of virtual camera views of the physical entity modeled by the test 3D map, and 3) output the set of 2D images to the neural network. The neural network is configured to output an inconsistency value indicating a degree to which the test 3D map includes inconsistencies based on analysis of the set of 2D images collectively corresponding to the volumes of the view frustums of the plurality of virtual camera views.

20 Claims, 7 Drawing Sheets

(56) References Cited

U.S. PATENT DOCUMENTS

2020/0074672 A1* 3/2020 Hoff ............... G06T 19/006
2020/0410746 A1* 12/2020 Shin ............... H04N 13/383

OTHER PUBLICATIONS

Tao, et al., "3D Shape Completion with Multi-view Consistent Inference", In Repository of arXiv:1911.12465, Nov. 28, 2019, 8 Pages.

Degol, et al., "Improved Structure from Motion Using Fiducial Marker Matching", In Proceedings of the European Conference on Computer Vision, Sep. 8, 2018, 16 Pages.

Pfingsthorn, et al., "Generalized Graph Slam: Solving Local and Global Ambiguities Through Multimodal and Hyperedge Constraints", In the International Journal of Robotics Research, vol. 35, Issue 6, May 2016, pp. 601-630.

Sunderhauf, et al., "Switchable Constraints for Robust Pose Graph SLAM", In Proceedings of International Conference on Intelligent Robots and Systems, Oct. 7, 2012, pp. 1879-1884.

Zach, et al., "Disambiguating Visual Relations Using Loop Constraints", In Proceedings of IEEE Computer Society Conference on Computer Vision and Pattern Recognition, Jun. 13, 2010, pp. 1426-1433.

* cited by examiner

THREE-DIMENSIONAL MAP INCONSISTENCY DETECTION USING NEURAL NETWORK

BACKGROUND

Three-dimensional (3D) maps modeling physical entities in the real world have become more and more prevalent across different applications and industries. As the scale of such 3D maps increases, manual quality assurance of such 3D maps is not feasible. Moreover, relying on 3D maps that have various inconsistencies may result in degraded user experiences regardless of the application or industry in which the 3D map is employed.

SUMMARY

A computing system is disclosed including a three-dimensional (3D) map inconsistency detection machine that includes an input transformation layer connected to a neural network. The input transformation layer is configured to 1) receive a test 3D map including 3D map data modeling a physical entity, 2) transform the 3D map data into a set of 2D images collectively corresponding to volumes of view frustums of a plurality of virtual camera views of the physical entity modeled by the test 3D map, and 3) output the set of 2D images to the neural network. The neural network is configured to output an inconsistency value indicating a degree to which the test 3D map includes inconsistencies based on analysis of the set of 2D images collectively corresponding to the volumes of the view frustums of the plurality of virtual camera views.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present description is directed to an approach for automatic, data-driven, and holistic detection of inconsistencies in sparse and unstructured three-dimensional (3D) maps that model real-word, physical entities. Such an approach is embodied by a three-dimensional (3D) map inconsistency detection machine that is configured to receive a test 3D map representing the physical world with potential inconsistencies. The 3D map inconsistency detection machine includes an input transformation layer that is configured to transform 3D map data of the test 3D map into a form that is compatible with a standard two-dimensional convolutional neural network (2D CNN) previously trained on a set of 2D image training data converted from 3D map data using the input transformation layer. In particular, the input transformation layer maps sparse 3D data into a dense 2D structure consumable by conventional 2D CNNs. Such dense, connected 2D structure of the input data that enables such neural networks to detect inconsistencies in a robust and accurate manner.

In some implementations, the 3D map inconsistency detection machine optionally may include an ensemble of neural networks that are each trained to analyze different input representations of a test 3D map and output different inconsistency detection data that is combined to inform a combined indication of inconsistency in the test 3D map.

As defined herein, a 3D map is a graph structure of 3D map data that models a physical entity in three dimensions. In some examples, the graph structure of the 3D map data may include nodes, such as observation nodes (cameras) and geometry nodes (3D-points) connected via edges, such as observation edges and visibility edges. In other examples, the graph structure of the 3D map data may be organized in a different manner. Furthermore, a physical entity that is modeled by a 3D map may include any suitable location (e.g., street, city, state, country, planet), construction (e.g., room, house, office building, industrial complex), or object (e.g., assembly, manufactured part, person, face).

Figure 1:
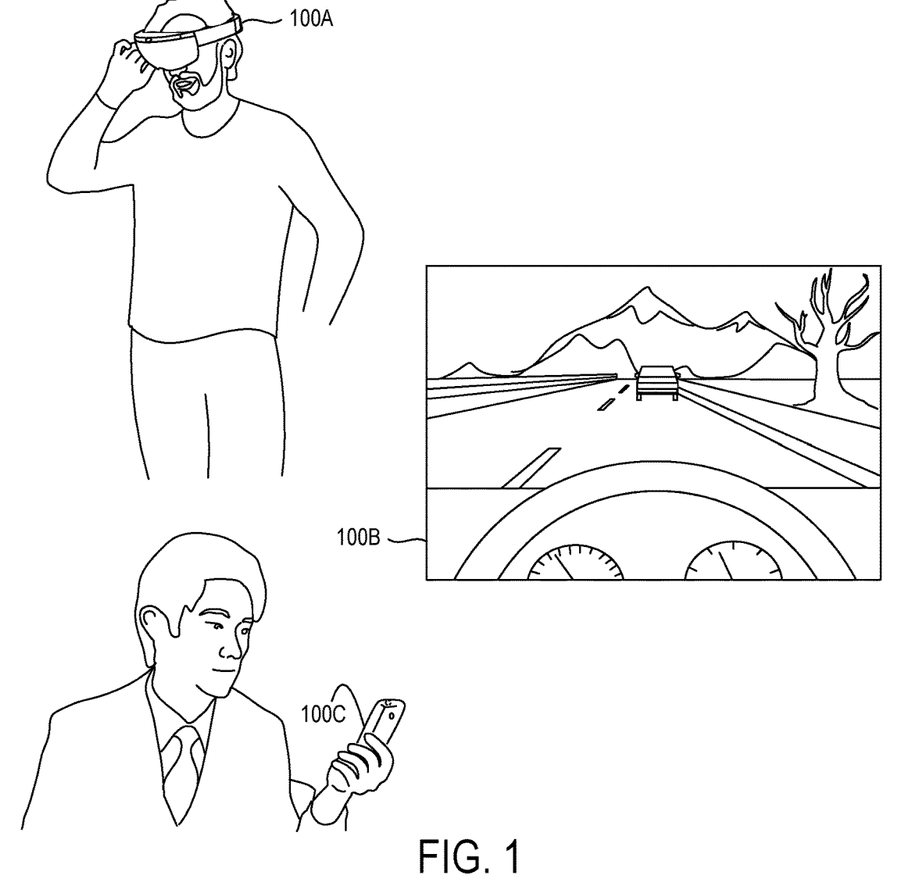
FIG. 1 shows aspects of different example computing devices that may use three-dimensional (3D) maps as part of a user experience.

FIG. 1 shows aspects of different example computing systems (100A and 100B) that use 3D maps. Computing system 100A is a head-mounted, near-eye display device configured to provide an augmented reality experience that relies on 3D maps of the surrounding real-world environment for sharing and persisting holograms over time. Computing system 100B is an automated driving system that controls vehicle functions, such as speed and steering based on 3D maps of the surrounding real-world environment. Such automated control using 3D maps also applies to industrial robotic applications where a robot navigates a real-world environment, such as a manufacturing facility or warehouse, using 3D maps. Computing system 100C is a mobile computing device, such as a smartphone that is configured to visually present 3D maps to a user, such that the user may navigate a surrounding real-world environment, such as a city. As these and other computing systems that rely on 3D maps become more ubiquitous and increase in scale, a significant number of 3D maps may be created by non-expert users. The creation of 3D maps by non-experts will likely introduce more inconsistencies. To address these and other issues related to 3D map inconsistencies, the herein described automatic 3D map inconsistency detection approach may be employed to automatically detect inconsistencies in 3D maps, such that the accuracy of newly created 3D maps may be increased and the quality of existing 3D maps may be preserved.

Figure 2:
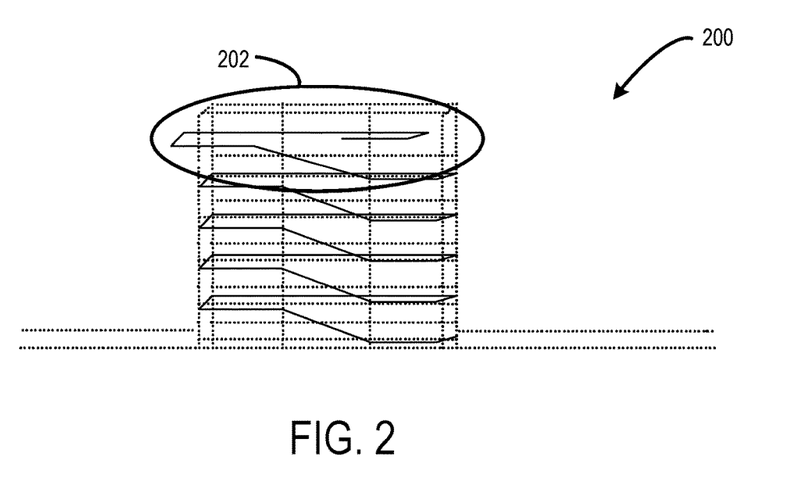
FIG. 2 shows an example 3D map having inconsistencies

A 3D map may include any suitable type and number of different inconsistencies that can be detected by the approaches described herein. Non-limiting examples of such inconsistencies include gaps in reconstruction of entities, incorrectly connected components, outdated geometry/geography that has become erroneous over time, and various other errors. FIG. 2 shows an example 3D map 200 including an inconsistency 202. The illustrated 3D map 200 models a five-story building. The 3D map 200 is represented by a graph structure including camera trajectories (lines) and 3D points (dots). The inconsistency 202 illustrates that a top floor of the building is shifted relative to the other floors of the building, such that the staircase going down to a next lowest floor in the building appears distorted (e.g., elongated). Such 3D map inconsistencies may negatively affect a user experience. The illustrated building is provided as a non-limiting example where a 3D map has an inconsistency that could be detected using the automatic inconsistency detection approaches described herein. For example, such a 3D map may be employed in the construction industry as part of a Building Information Model. It will be appreciated that any suitable type of 3D map modeling any suitable type of entity may have any suitably type of inconsistency, which may be automatically detected using the approaches described herein.

Figure 3:
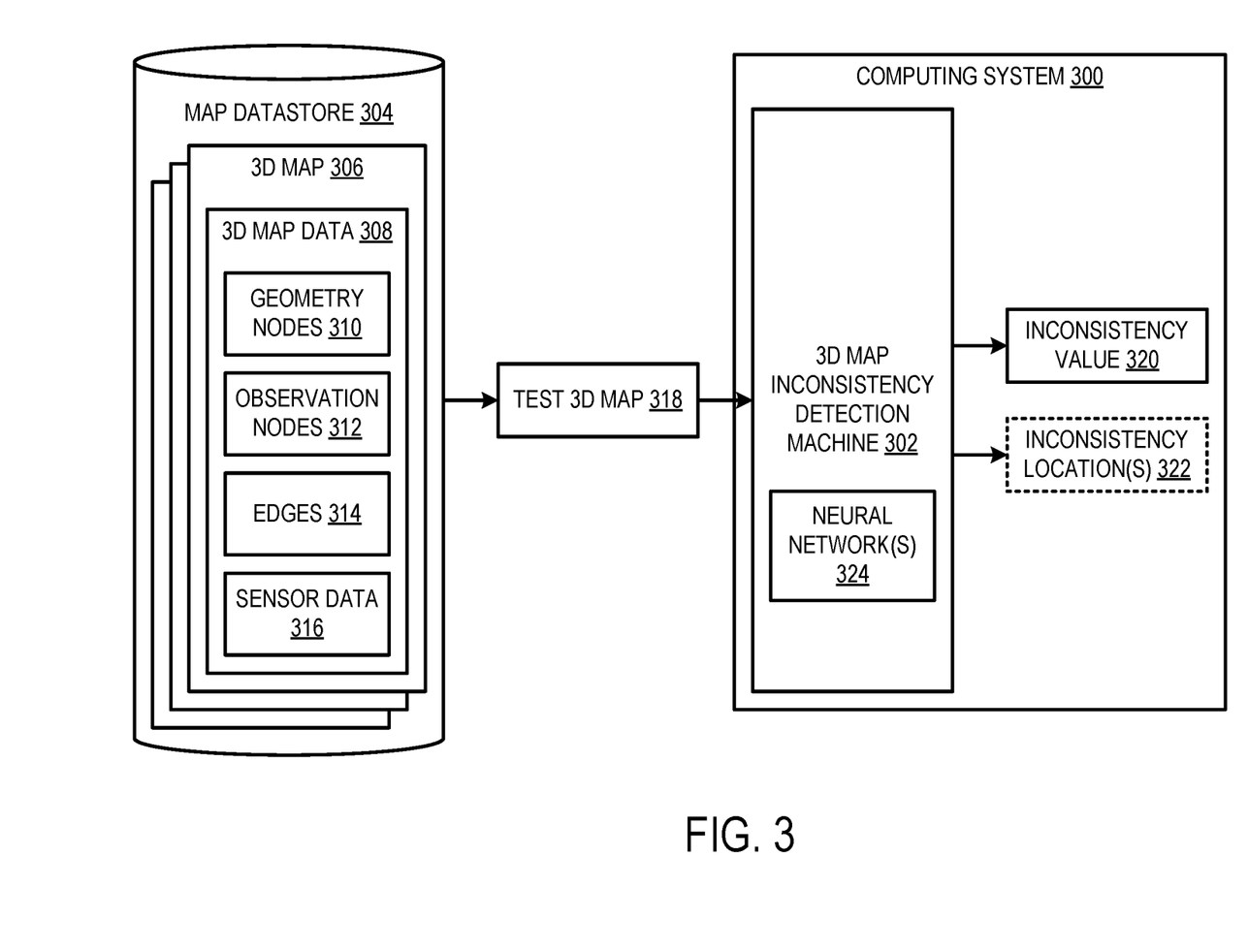
FIG. 3 shows an example computing system including a 3D map inconsistency detection machine.

FIG. 3 shows an example computing system 300 in simplified form. The computing system 300 includes a 3D map inconsistency detection machine 302. The computing system 300 is communicatively coupled to a map datastore 304. The map datastore 304 is configured to store a plurality of 3D maps, such as 3D map 306. Each 3D map 306 includes 3D map data 308. In the illustrated example, the 3D map data 308 includes a graph structure including geometry nodes 310 and observation nodes 312 connected by edges 314. The geometry nodes 310 provide geometric information about particular 3D points of an entity modeled by the 3D map 306. The geometry nodes 310 collectively represent a modeled entity's geometry or structure. The observation nodes 312 represent camera positions for viewing different aspects of the modeled entity from different perspectives. In other implementations, the 3D map data 308 of each 3D map may be organized in a different manner that is sparse and three-dimensional. In another example, the 3D map data 308 may include one or more unstructured geometry node(s) encoded with 3D position data. In other words, the 3D map data may be organized into a point cloud.

In some implementations, 3D map data of one or more of the 3D maps optionally may include sensor data 316 that may further inform the 3D structure of the entity being modeled by the 3D map 306. In some examples, the sensor data 316 may include pose or motion data. As one example, such pose or motion data may be generated by an inertial measurement unit (IMU). It will be appreciated that sensor data that informs a 3D map may be provided from any suitable type of sensor.

The map datastore 304 may be configured to store any suitable number of different 3D maps having any suitable format and created using any suitable algorithm. In some examples, the plurality of 3D maps may be created by the same source. In other examples, the plurality of 3D maps may be created by different sources. In some examples, different 3D maps may be in different stages of completion. Some 3D maps may be fully completed, and other 3D maps may be still being built or still under construction.

The 3D map inconsistency detection machine 302 may be implemented as any suitable physical hardware, software, and/or firmware component. In some implementations, the 3D map inconsistency detection machine 302 and the map datastore 304 may be combined in a shared enclosure. In some implementations, aspects of the 3D map inconsistency detection machine 302 and the map datastore 304 may be integrated together into one or more hardware-logic components. In some implementations, aspects of the 3D map inconsistency detection machine 302 may be implemented on a computing device that is remote from the map datastore 304. For example, aspects of the 3D map inconsistency detection machine 302 may be implemented via a service computing system in communication with the remote computing device via a computer network, such as the Internet.

The 3D map inconsistency detection machine 302 is configured to perform automatic inconsistency detection on one or more of the plurality of 3D maps stored in the map datastore 304. In some examples, the 3D map inconsistency detection machine 302 may test some or all of the 3D maps stored in the map datastore 304. In some examples, the 3D map inconsistency detection machine 302 may test an individual 3D map. For example, the 3D map inconsistency detection machine 302 may be configured as an on-demand service. The 3D map inconsistency detection machine 302 is configured to receive a test 3D map 318 representing a modeled entity in the physical world with one or more potential inconsistencies. The 3D map inconsistency detection machine 302 is configured to output an inconsistency value 320 indicating a degree to which the test 3D map 318 includes inconsistencies based on analysis of the test 3D map 318. For example, the inconsistency value 320 may include a value between 0 and 1 with a number closer to 0 indicating that the test 3D map is more inconsistent or corrupted and a number closer to 1 indicate that the test 3D map is less inconsistent (i.e., cleaner and more coherent). The inconsistency value 320 may take any suitable form that quantifies the degree to which the test 3D map 318 includes inconsistencies.

In some implementations, the 3D map inconsistency detection machine 302 is configured to output one or more inconsistency locations on the test 3D map 318 that are inconsistent with the physical entity modeled by the test 3D map 318. The 3D map inconsistency detection machine 302 may perform such inconsistency localization using any suitable localization techniques, e.g. by tracing back activations to a network input via gradient-based localization or activation mapping. In some implementations, the 3D map inconsistency detection machine may be configured to output additional inconsistency information, such as inconsistency segmentation.

The 3D map inconsistency detection machine 302 may be configured to use one or more trained neural networks 324 to detect inconsistencies in a test 3D map based on analysis of 3D map data and/or corresponding two-dimensional (2D) projections derived from the 3D map data as described in further detail below. Such analysis and inconsistency detection may be performed regardless of the technique used to create the test 3D map and instead depends on the 3D map's representation. By analyzing the actual representation of the 3D map and not having to know the technique used to create the 3D map (i.e., decoupling the analysis process from the building process), the analysis may be agnostic to any one map building technique, and therefore can be applied to a larger set of 3D maps built using many different algorithms. Map building requires a generative process and knowledge of a particular algorithm while the analysis/inconsistency detection can be performed in a discriminative manner that is data driven and holistic. Moreover, such analysis and inconsistency detection may be applicable after map creation. Nevertheless, such analysis and inconsistency detection can be used during the map building stage as well.

The 3D map inconsistency detection machine 302 may be configured to use any suitable neural network to analyze the 3D map data 308 of any 3D map 306 to detect inconsistencies in the 3D map 306.

Figure 4:
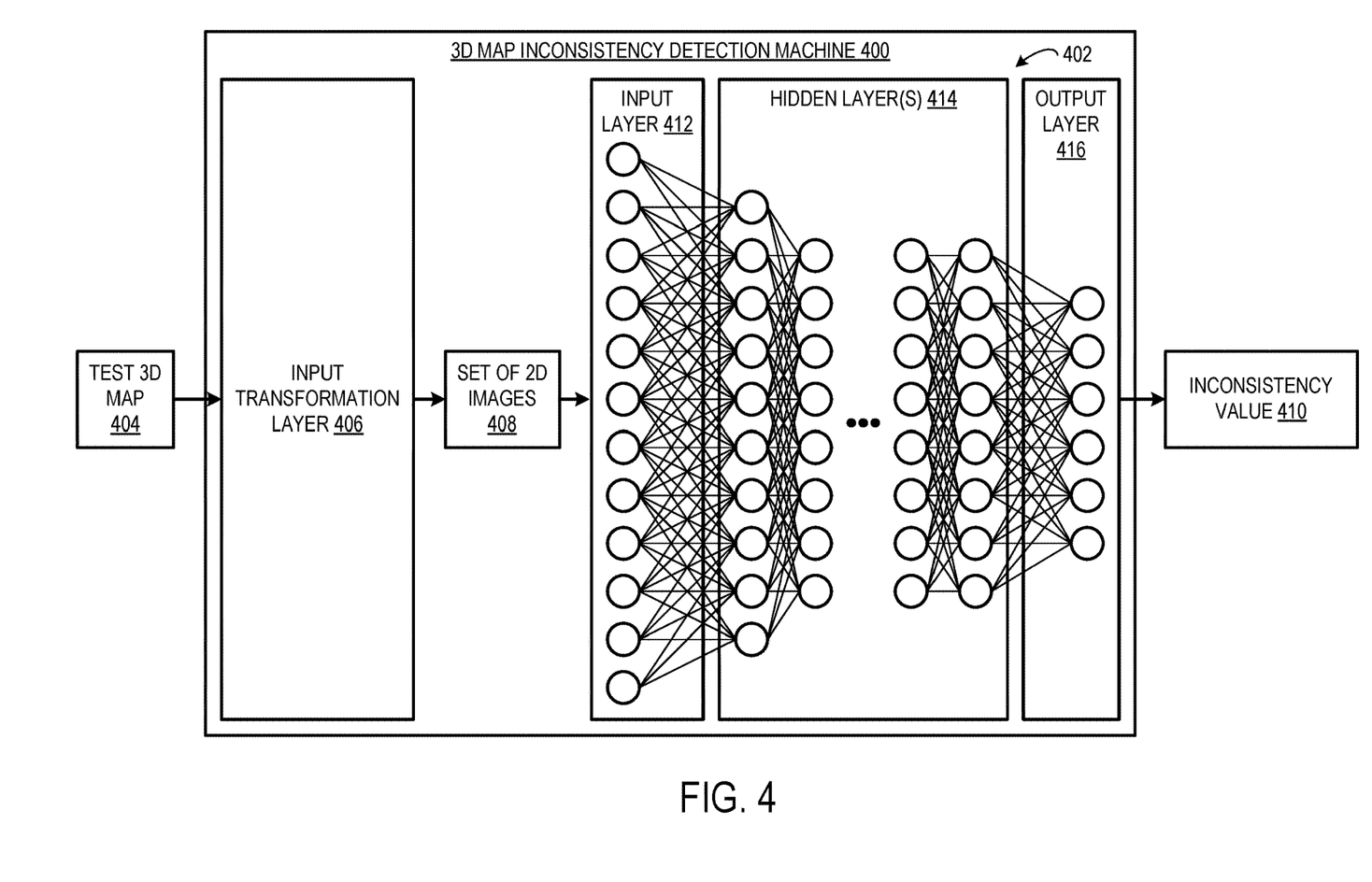
FIG. 4 shows an example 3D map inconsistency detection machine configuration using a neural network.

FIG. 4 shows an example 3D map inconsistency detection machine 400 including a neural network 402. The 3D map inconsistency detection machine 400 is one example implementation of the 3D map inconsistency detection machine 302 shown in FIG. 3. In some examples, the neural network 402 may be a two-dimensional convolutional neural network (2D CNN), which may be referred to as a "vanilla" neural network having a standard network topology that is mature. A test 3D map 404 that is provided as input to the 3D map inconsistency detection machine 400 often is sparse, three-dimensional, and organized in a graph structure. Such a form of input is in stark contrast to the regular structure that is compatible with the vanilla neural network, which typically is dense and regularly connected input, e.g. via (2D) spatial proximity. As such, to facilitate compatibility, the 3D map inconsistency detection machine includes an input transformation layer 406 connected to a front end of the neural network 402.

The input transformation layer 406 is configured to transform the sparse, three-dimensional, graph structure of the test 3D map 404 into dense and regularly connected 2D input data that is compatible with the neural network 402. In particular, the input transformation layer 406 is configured to receive the test 3D map 404 and output a set of 2D images 408 representing 2D projections of the entity modeled by the test 3D map. By transforming the 3D map data of the input into 2D projections, the input data may be rendered accessible such that the standard neural network can consume and analyze the 2D projections and detect inconsistencies in the test 3D map.

Figure 5:
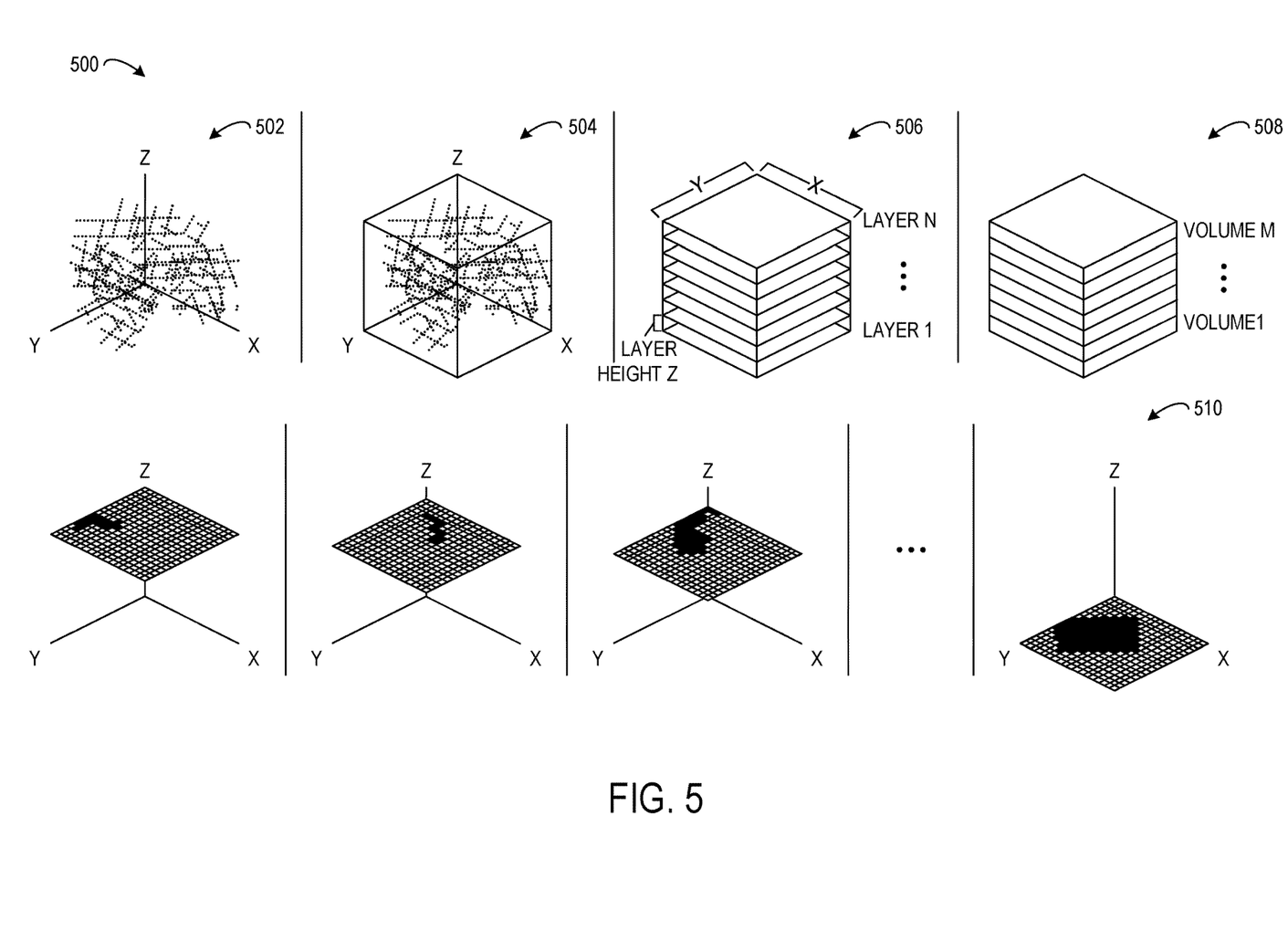
FIG. 5 shows an example 3D map input transformation process.

FIG. 5 shows an example transformation process 500 that may be performed by the input transformation layer 406 shown in FIG. 4 to generate the set of 2D images 408 from the 3D map data of the test 3D map 404. At 502, the input transformation layer 406 is configured to convert the 3D data (e.g., observation and geometry nodes connected by edges) into a 3D point cloud including a plurality of 3D points. For example, the 3D point cloud may be formed such that the 3D point cloud has maximum point density. A point in 3D space may be represented as a sphere with adaptive radius selection optimizing for pixel density in the final 2D image output from the input transformation layer 406.

At 504, the input transformation layer 406 is configured to contain the 3D point cloud in a 3D bounding box having dimensions (e.g., X, Y) fit to a 2D image frame.

At 506, the input transformation layer 406 is configured to select N virtual camera views in 3D space (e.g., LAYERS 1-N). The virtual camera views may be selected to collectively capture all of the points of the 3D point cloud. The number and position of the virtual camera views that are selected may be dependent on the size and/or density of the 3D point cloud. For example, the input transformation layer 406 may be configured to place a virtual camera at equidistant locations to collectively cover all of the different 3D points in the 3D model. In particular, ray-casting may be used to determine a "1st person view" of the modeled entity (e.g., the virtual scene) from the location of the virtual camera. Such 1st person views may define a view frustum of each virtual camera location. "Selecting" of virtual camera views may encompass any suitable way of obtaining such views, including implementations in which the views are provided to the input transformation layer from another component. In examples where the 3D map data includes camera trajectories including individual keyframes with a known rigid transformation encoded into the 3D map data, the position of the cameras may be encoded by drawing them as bounding boxes into the image. Rotation may be represented as a line going from the center of the bounding box to an outer border of the bounding box. In some examples, the view selection can be driven by gravity alignment of the 3D map when IMU data or other sensor data is available.

At 508, the input transformation layer 406 is configured to programmatically subdivide each view frustum of each virtual camera view into M volumes (e.g., VOLUMES 1-M). At 510, the input transformation layer 406 is configured to, for each volume, render all 3D points of the 3D point cloud contained within the volume into a 2D image. The input transformation layer 406 is configured to render a separate 2D image (e.g., feature map) for each of the plurality of volumes that collectively makeup the view frustum of the camera view. The input transformation layer 406 is configured to render 2D images in this manner for each of the plurality of virtual camera views selected to collectively cover the 3D point cloud. In some examples, additional information related to features of the 3D structures of the test 3D map may be encoded into different color channels of the 2D images. Neural networks may be configured to process any suitable number of color channels per image. This feature allows for additional spatial location/pixel information, such as a number of additional values corresponding to uncertainties of the 3D point to be stored in different color channels of the 2D images. The input transformation layer 406 is configured to output a set of 2D images (e.g., feature maps) 408 collectively corresponding to the volumes of the view frustums of the plurality of virtual camera views to the neural network 402 shown in FIG. 4. Each of the 2D images may encode occupancy/point density at different distances away from each virtual camera view in each view frustum. Note that the 2D images may be sampled and fed to the neural network 402 in the same order, such that the neural network is able to (implicitly) understand relations between the different virtual camera views. In particular, 2D images that collectively correspond to the view frustum of each virtual camera view may be output to the neural network in a same designated order on a per virtual camera view basis. For example, for each virtual camera view, 2D images making up the view frustum for the virtual camera view may be output to the neural network from according to a front to back order, such that 2D images closer to the virtual camera view are fed to the neural network ahead of 2D images further from the virtual camera view.

Since the 3D map inconsistency detection machine performs this transformation process on test 3D map, the 3D map inconsistency detection machine need not have any knowledge of a particular algorithm or a generative process of the test 3D map, which allows the 3D map inconsistency detection machine to perform analysis/inconsistency detection in a discriminative manner that is data driven and holistic.

Returning to FIG. 4, in some examples, the neural network 402 may be a convolutional neural network configured to determine an inconsistency value 410 that corresponds to the inconsistency value 320 shown in FIG. 3. The convolutional neural network 402 includes a plurality of layers including an input layer 412, one or more hidden layers 414, and an output layer 416. The input layer 412 includes a plurality of input nodes. Each input node is configured to receive one or more pixel values of a 2D image that is input from the 2D image set 408.

The convolutional neural network 402 is configured to convolve input tensors with one or more predefined, and/or learned convolutional kernels included in hidden layer(s) 414. By convolving the convolutional kernels with an input tensor (e.g., representing pixel value(s) of the 2D image), the convolutional neural network 402 may detect a feature associated with the convolutional kernel. For example, a convolutional kernel may be convolved with a 2D image to detect low-level visual features such as lines, edges, corners, etc., based on various convolution operations with a plurality of different convolutional kernels. Convolved outputs of the various convolution operations may be processed by a pooling layer (e.g., max pooling) which may detect one or more most salient features of the input image and/or aggregate salient features of the input image, in order to detect salient features of the input image at particular locations in the input image. Pooled outputs of the pooling layer may be further processed by further convolutional layers.

Convolutional kernels of further convolutional layers may recognize higher-level two dimensional (2D) visual features, e.g., shapes and patterns, and more generally spatial arrangements of lower-level visual features. Some layers of the convolutional neural network may accordingly recognize and/or locate 3D visual features of entity modeled by the 3D map and correspondingly inconsistencies for which the 3D map inconsistency detection machine 400 is trained to recognize.

The pooled outputs of the hidden layer(s) 414 may be output to the output layer 416. The output layer 416 may be configured to output the inconsistency value 410 indicating a degree to which the test 3D map 404 includes inconsistencies based on analysis of the set of 2D images 408 collectively corresponding to the volumes of the view frustums of the plurality of virtual camera views performed by the different hidden layers 414. Accordingly, the convolutional neural network 402 may automatically detect potential inconsistencies in a test 3D map input to the 3D map inconsistency detection machine. In some implementations, the convolutional neural network 402 optionally may be further configured to output locations of inconsistencies detected in the test 3D map as well as inconsistency segmentation.

Although the foregoing example is described with regard to a convolutional neural network, other neural network techniques may be able to detect and/or locate specified object and other salient features based on detecting low-level 2D visual features, 2D higher-level visual features, 3D visual features, and/or spatial arrangements of visual features.

Figure 6:
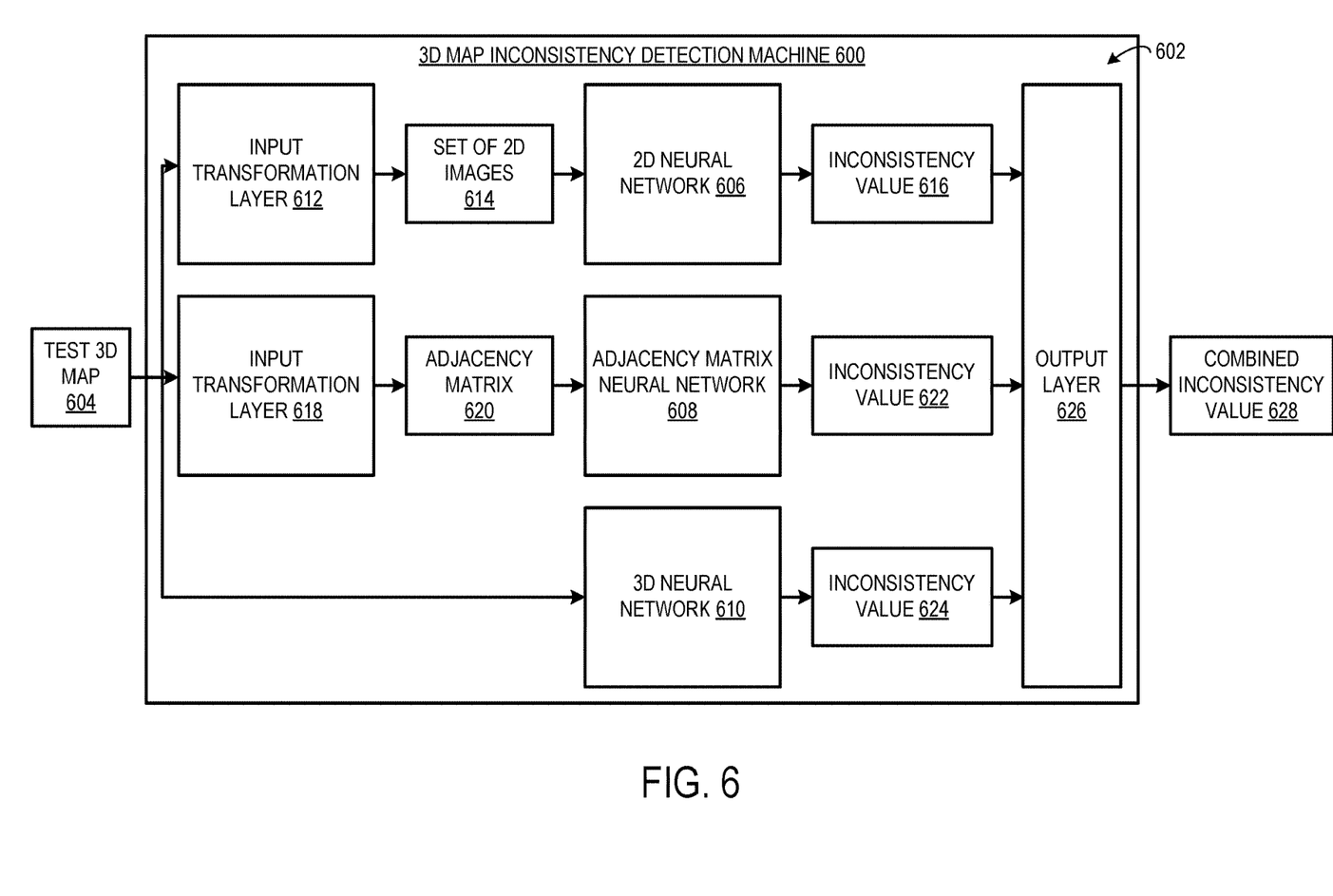
FIG. 6 shows an example 3D map inconsistency detection machine configuration using an ensemble neural network.

FIG. 6 shows another example 3D map inconsistency detection machine 600 configuration that uses an ensemble neural network 602. The 3D map inconsistency detection machine 600 is another example implementation of the 3D map inconsistency detection machine 302 shown in FIG. 3. The ensemble neural network 602 includes a plurality of neural networks that are differently configured to analyze different forms of data derived from a test 3D map 604 input to the 3D map inconsistency detection machine 600. The test 3D map 604 corresponds to the test 3D map 318 shown in FIG. 3. In particular, the ensemble neural network 602 includes a first neural network (i.e. 2D NEURAL NETWORK) 606, a second neural network (i.e., ADJACENCY MATRIX NEURAL NETWORK) 608, and a third neural network (i.e., 3D NEURAL NETWORK) 610 that operate in parallel to each generate a separate inconsistency value based on different types of analysis of 3D map data of the test 3D map 604.

The first neural network 606 is functionally the same as the neural network 402 shown in FIG. 4. The ensemble neural network includes a first input transformation layer 612 that is connected to the first neural network 606. The first input transformation layer 612 is functionally the same as the input transformation layer 406 shown in FIG. 4. The first input transformation layer 612 is configured to transform the test 3D map 604 into a set of 2D images 614 collectively corresponding to volumes of view frustums of a plurality of virtual camera views of the entity modeled by the test 3D map 604. The input transformation layer 612 outputs the set of 2D images 614 to the first neural network 606. The first neural network 606 is configured to output a first inconsistency value 616 indicating a degree to which the test 3D map 604 includes inconsistencies based on analysis of the set of 2D images 614 collectively corresponding to the volumes of the view frustums of the plurality of virtual camera views.

A second input transformation layer 618 is configured to convert 3D map data of the test 3D map 604 into an adjacency matrix 620. The adjacency matrix 620 may represent the 3D graph structure of the test 3D map. Elements of the adjacency matrix 620 indicate whether pairs of vertices of the graph structure are adjacent or not in the graph. Such an adjacency matrix may facilitate feature identification by analyzing "neighborhoods" of pixels. More particularly, such analysis of the adjacency matrix provides an alternative approach to identifying inconsistencies in the test 3D map.

The second neural network 608 may be trained using training data that includes a set of adjacency matrices that are labeled with inconsistencies and correspond to 3D maps having those same inconsistencies. Based on such training, the second neural network 608 is configured to analyze the adjacency matrix 620 and output a second inconsistency value 622 based on analysis of the adjacency matrix 620. The second neural network 608 is configured to use a holistic view of analysis of the 3D map data in the form of a single adjacency matrix representing the 3D map, i.e. there is no need for generating multiple heuristic 2D projections of the 3D map, which is required by the first neural network 606. Additionally, the second neural network 608 operates on a relatively low-dimensional space, and therefore is easier to train than the first neural network 606. The additional alternative form of analysis performed by the second neural network 608 may increase the overall robustness of the inconsistency detection provided by the ensemble network 602 relative to a neural network that analyzes a single representation of the test 3D map.

The third neural network 610 is configured to receive the test 3D map 604 directly as input. The third neural network 610 is configured to analyze the 3D graph itself and output a third inconsistency value 624 based on analysis of the 3D graph. The third neural network 610 may include an irregular network topology, which has smaller available set of training data (e.g., 3D graphs). In one example, the third neural network 610 on a set of training data that includes 3D graphs having a bi-partite structure with two sets of nodes per partition, the observation nodes (cameras) and geometry nodes (3D-points/observations). This topology implies that the information flow is different from the network architecture of the other neural networks of the ensemble neural network 602. Since the third neural network 610 is configured to analyze the graph topology directly, there is no need to perform any resampling of the graph structured input data via an input transformation layer in this case. Additionally, the third neural network 610 does not need to learn that "empty" parts of the embedding space should be ignored, which may be the case with one or more of the other neural networks. The additional alternative form of analysis performed by the third neural network 610 may increase the overall robustness of the inconsistency detection provided by the ensemble network 602 relative to a neural network that analyzes a single representation of the test 3D map.

The ensemble neural network 602 includes an output layer 626 configured to receive the first inconsistency value 616 output from the first neural network 606, the second inconsistency value 622 output from the second neural network 608, and the third inconsistency value 624 output from the third neural network 610. The output layer 626 may be configured to output a combined inconsistency value 628 based on the first, second, and third inconsistency values 616, 622, 624. The output layer 626 may determine the combined inconsistency value 628 based on the first, second, and third inconsistency values 616, 622, 624 in any suitable learned manner. In some implementations, one or more of the neural networks optionally may be configured to output locations of detected inconsistencies. In some examples, the inconsistency locations output by different neural networks may be compared to provide a more robust estimation of the locations of inconsistencies. The 3D map inconsistency detection machine 302 may be configured to output the combined inconsistency value 328, the locations (e.g., bounding boxes) of the recognized inconsistencies, pixel-specific labels of the locations, and/or any other information produced as a result of analyzing the 3D map data (including sensor data when available) of the test 3D map 604. In some implementations, the ensemble network may include any combination of two of the three neural networks depicted in FIG. 6.

The 3D map inconsistency detection machine 302 shown in FIG. 3 (and/or machine 400 shown in FIG. 4 and/or machine 600 shown in FIG. 6) may employ any suitable combination of state-of-the-art and/or future machine learning (ML) and/or artificial intelligence (AI) techniques. Non-limiting examples of techniques that may be incorporated in an implementation of the 3D map inconsistency detection machine 302 include structured support vector machines, multi-layer neural networks, convolutional neural networks (e.g., including spatial convolutional networks for processing images and/or videos), recurrent neural networks (e.g., long short-term memory networks), associative memories (e.g., lookup tables, hash tables, Bloom Filters, Neural Turing Machine and/or Neural Random Access Memory), unsupervised spatial and/or clustering methods (e.g., nearest neighbor algorithms, topological data analysis, and/or k-means clustering) and/or graphical models (e.g., Markov models, conditional random fields, and/or AI knowledge bases).

In some examples, the methods and processes utilized by the 3D map inconsistency detection machine 302 may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters may be adjusted through any suitable training procedure, in order to continually improve functioning of the 3D map inconsistency detection machine 302. In some examples, the neural network(s) of the 3D map inconsistency detection machine may be trained with a set of labeled training 3D maps including 3D maps that are deformed, incomplete, or have corrupted data.

Non-limiting examples of training procedures for the 3D map inconsistency detection machine 302 include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or based on generative adversarial neural network training methods. In some examples, a plurality of components of the 3D map inconsistency detection machine 302 may be trained simultaneously with regard to an objective function measuring performance of collective functioning of the plurality of components (e.g., with regard to reinforcement feedback and/or with regard to labeled training data), in order to improve such collective functioning. In some examples, one or more components of the 3D map inconsistency detection machine 302 may be trained independently of other components (e.g., offline training on historical data). For example, the 3D map inconsistency detection machine 302 may be trained via supervised training on labeled training data comprising images with labels indicating any 3D map inconsistencies present within such images, and with regard to an objective function measuring an accuracy, precision, and/or recall of locating 3D map inconsistencies by the 3D map inconsistency detection machine 302 as compared to actual locations of inconsistencies indicated in the labeled training data.

Note that the 3D map inconsistency detection machine 302 may be configured to output 3D map inconsistency value/location/segmentation data to any suitable recipient internal or external to the 3D map inconsistency detection machine 302. For example, the 3D map inconsistency detection machine 302 may be configured to output 3D map inconsistency data to another processing component for additional image processing. In some examples, the processing component may be incorporated into the 3D map inconsistency detection machine 302. In some examples, the processing component may be incorporated into the computing system 300. In some examples, the processing component may be incorporated into a remote computing device in communication with the 3D map inconsistency detection machine 302. In another example, the 3D map inconsistency detection machine 302 may be configured to output 3D map inconsistency data to an external display device for visual presentation of the 3D map inconsistency data.

Figure 7:
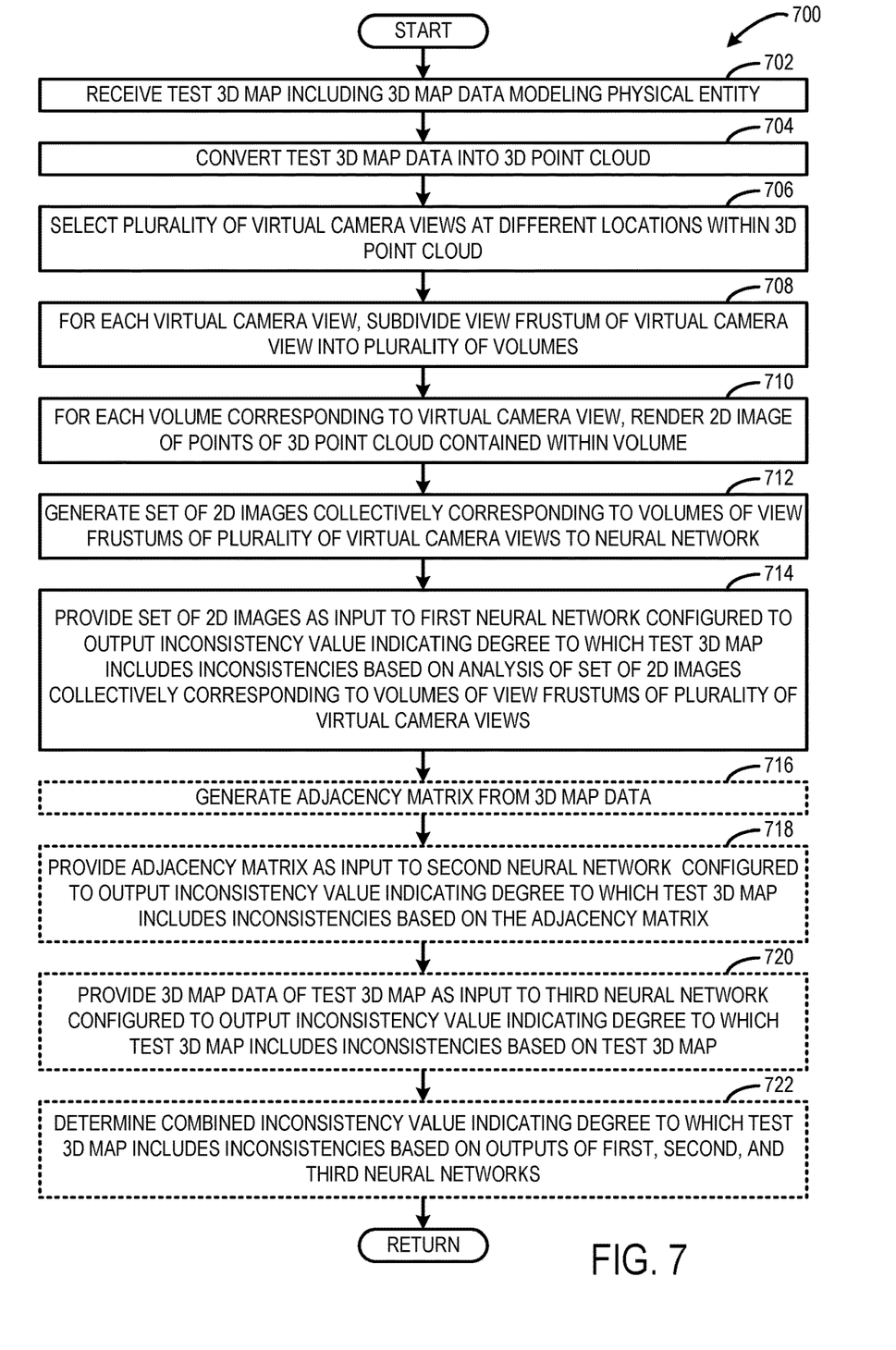
FIG. 7 shows an example 3D map inconsistency detection method.

FIG. 7 shows an example 3D map inconsistency detection method 700 using an 3D map inconsistency detection machine, such as the machine 302 shown in FIG. 3, the machine 400 shown in FIG. 4, and/or the machine shown in FIG. 6. At 702 the method 700 includes receiving a test 3D map including 3D map data modeling a physical entity. In some examples, the 3D map data may include a sparse graph structure of observation nodes and geometry nodes connected via edges. In some examples, the 3D map data may include IMU sensor data. At 704, the method 700 includes converting the test 3D map data into a 3D point cloud. At 706, the method 700 includes selecting a plurality of virtual camera views at different locations within the 3D point cloud. In some examples, the virtual camera views may be positioned at equidistant locations across the 3D point cloud. At 708, the method 700 includes for each virtual camera view, subdividing a view frustum of the virtual camera view into a plurality of volumes. At 710, the method 700 includes for each volume corresponding to the virtual camera view, rendering a 2D image of points in the 3D point cloud contained within the volume. At 712, the method 700 includes generating a set of 2D images collectively corresponding to the volumes of the view frustums of the plurality of virtual camera views. At 714, the method 700 includes providing the set of 2D images as input to a first neural network (e.g., neural network 402 shown in FIG. 4) configured to output an inconsistency value indicating a degree to which the test 3D map includes inconsistencies based on analysis of the set of 2D images collectively corresponding to the volumes of the view frustums of the plurality of virtual camera views. Such inconsistencies detected by the first neural network may include one or more of outdated geometry, gaps in reconstruction, and incorrectly connected components. In some implementations, the first neural network optionally may be configured to output one or more locations on the test 3D map that are inconsistent with the physical entity modeled by the test 3D map, such output being based on analysis of the set of 2D images corresponding to collective volumes of the view frustums of the plurality of virtual camera views.

In some implementations, at 716, the method 700 optionally may include generating an adjacency matrix from the 3D map data. At 718, the method 700 optionally may include providing the adjacency matrix as input to a second neural network configured to output an inconsistency value indicating a degree to which the test 3D map includes inconsistencies based on the adjacency matrix. At 720, the method 700 optionally may include providing the 3D map data of the test 3D map as input to a third neural network configured to output an inconsistency value indicating a degree to which the test 3D map includes inconsistencies based on analysis of the 3D map data. At 722, the method 700 optionally may include determining a combined inconsistency value indicating a degree to which the test 3D map includes inconsistencies based on outputs of the first, second, and/or third neural networks.

Figure 8:
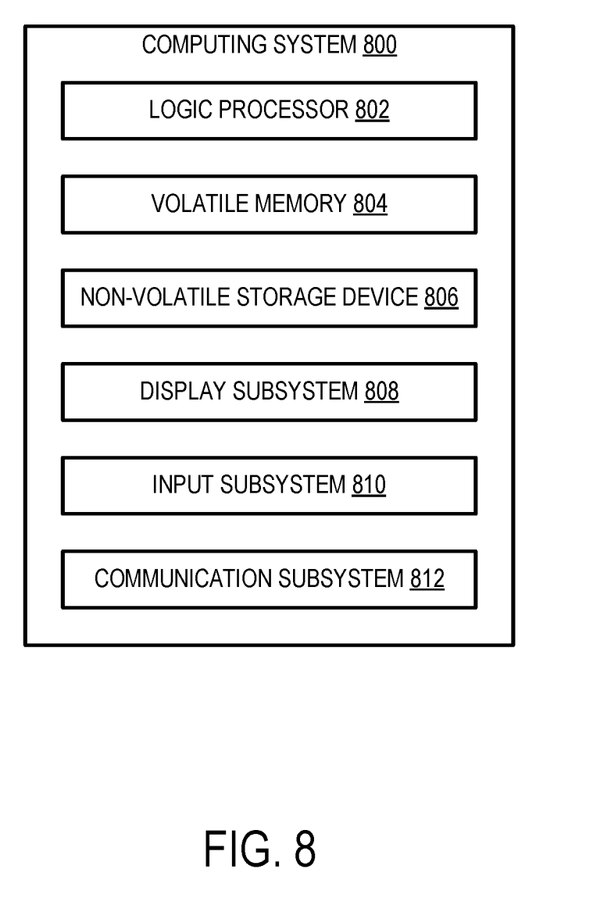
FIG. 8 shows an example computing system.

FIG. 8 schematically shows a non-limiting implementation of a computing system 800 that can enact one or more of the methods and processes described above. Computing system 800 is shown in simplified form. Computing system 800 may embody the computing system 300 and the map datastore 304 described above and illustrated in FIG. 3 Computing system 800 may take the form of one or more personal computers, server computers, tablet computers, home-entertainment computers, network computing devices, gaming devices, mobile computing devices, mobile communication devices (e.g., smart phone), wearable computing devices such as smart wristwatches, head-mounted augmented/mixed virtual reality devices and/or other computing devices.

Computing system 800 includes a logic processor 802, volatile memory 804, and a non-volatile storage device 806. Computing system 800 may optionally include a di splay sub system 808, input sub system 810, communication sub system 812, and/or other components not shown in FIG. 8.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "module" may be used to describe an aspect of computing system 800 typically implemented by a processor to perform a particular function using portions of volatile memory, which function involves transformative processing that specially configures the processor to perform the function. Thus, a module may be instantiated via logic processor 802 executing instructions held by non-volatile storage device 806, using portions of volatile memory 804. It will be understood that different modules may be instantiated from the same application, service, code block, object, library, routine, API, function, pipeline, etc. Likewise, the same module, program, and/or engine may be instantiated by different applications, services, code blocks, objects, routines, APIs, functions, etc. The term "module" may encompass individual or groups of executable files, data files, libraries, drivers, scripts, database records, etc.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some implementations, the communication subsystem may allow computing system 800 to send and/or receive messages to and/or from other devices via a network such as the Internet.

In an example, a computing system comprises a three-dimensional (3D) map inconsistency detection machine including an input transformation layer connected to a neural network, the input transformation layer being configured to receive a test 3D map including 3D map data modeling a physical entity, convert the test 3D map data into a 3D point cloud, select a plurality of virtual camera views at different locations within the 3D point cloud, for each virtual camera view, subdivide a view frustum of the virtual camera view into a plurality of volumes, for each volume corresponding to the virtual camera view, render a 2D image of points of the 3D point cloud contained within the volume, and output a set of 2D images collectively corresponding to the volumes of the view frustums of the plurality of virtual camera views to the neural network, and wherein the neural network is configured to output an inconsistency value indicating a degree to which the test 3D map includes inconsistencies based on analysis of the set of 2D images collectively corresponding to the volumes of the view frustums of the plurality of virtual camera views. In this example and/or other examples, the 3D map data may include a sparse graph structure of observation nodes and geometry nodes connected via edges. In this example and/or other examples, the 3D map data may include inertial measurement unit (IMU) sensor data. In this example and/or other examples, the 3D map inconsistency detection machine may be configured to output one or more locations on the test 3D map that are inconsistent with the physical entity modeled by the test 3D map, such output being based on analysis of the set of 2D images collectively corresponding to the volumes of the view frustums of the plurality of virtual camera views. In this example and/or other examples, inconsistencies detected by the 3D map inconsistency detection machine may include one or more of outdated geometry, gaps in reconstruction, and incorrectly connected components. In this example and/or other examples, the neural network may be previously trained with a set of labeled training 3D maps including 3D maps that are deformed, incomplete, or have corrupted data. In this example and/or other examples, the virtual camera views may be positioned at equidistant locations across the 3D point cloud. In this example and/or other examples, 3D structures of the test 3D map may be encoded into each of the 2D images using multiple image channels. In this example and/or other examples, 2D images that collectively correspond to the view frustum of each virtual camera view may be output to the neural network in a same designated order on a per virtual camera view basis. In this example and/or other examples, the neural network may be a first neural network, the input transformation layer may be a first input transformation layer, the 3D map inconsistency detection machine may include a second input transformation layer connected to a second neural network, the second input transformation layer may be configured to generate an adjacency matrix from the 3D map data and provide the adjacency matrix as input to the second neural network, the second neural network may be configured to output an inconsistency value indicating a degree to which the test 3D map includes inconsistencies based on analysis of the adjacency matrix, and the first neural network and the second neural network may be connected to an output layer configured to determine a combined inconsistency value indicating a degree to which the test 3D map includes inconsistencies based on outputs of the first and second neural networks. In this example and/or other examples, the neural network may be a first neural network, the 3D map inconsistency detection machine may include a second neural network configured to receive the 3D map data, and output an inconsistency value indicating a degree to which the test 3D map includes inconsistencies based on analysis of the 3D map data, and the first neural network and the second neural network may be connected to an output layer configured to determine a combined inconsistency value indicating a degree to which the test 3D map includes inconsistencies based on outputs of the first neural network and the second neural network. In this example and/or other examples, the second neural network may be trained using a set of training data including 3D graphs having a bi-partite structure including a set of observation nodes and geometry nodes per partition.

In another example, a three-dimensional (3D) map inconsistency detection method performed by a computer, comprises receiving a test 3D map including 3D map data modeling a physical entity, converting the test 3D map data into a 3D point cloud, selecting a plurality of virtual camera views at different locations within the 3D point cloud, for each virtual camera view, subdividing a view frustum of the virtual camera view into a plurality of volumes, for each volume corresponding to the virtual camera view, rendering a 2D image of points in the 3D point cloud contained within the volume, generating a set of 2D images collectively corresponding to the volumes of the view frustums of the plurality of virtual camera views, and providing the set of 2D images as input to a neural network configured to output an inconsistency value indicating a degree to which the test 3D map includes inconsistencies based on analysis of the set of 2D images collectively corresponding to the volumes of the view frustums of the plurality of virtual camera views. In this example and/or other examples, the neural network may be a first neural network and the method may further comprise generating an adjacency matrix from the 3D map data, providing the adjacency matrix as input to a second neural network configured to output an inconsistency value indicating a degree to which the test 3D map includes inconsistencies based on the adjacency matrix, and determining a combined inconsistency value indicating a degree to which the test 3D map includes inconsistencies based on outputs of the first and second neural networks. In this example and/or other examples, the neural network may be a first neural network and the method may further comprise providing the 3D map data of the test 3D map as input to a second neural network configured to output an inconsistency value indicating a degree to which the test 3D map includes inconsistencies based on analysis of the 3D map data, and determining a combined inconsistency value indicating a degree to which the test 3D map includes inconsistencies based on outputs of the first and second neural networks. In this example and/or other examples, the 3D map data may include a sparse graph structure of observation nodes and geometry nodes connected via edges and inertial measurement unit (IMU) sensor data. In this example and/or other examples, the virtual camera views may be positioned at equidistant locations across the 3D point cloud. In this example and/or other examples, the 3D map inconsistency detection machine may be configured to output one or more locations on the test 3D map that are inconsistent with the physical entity modeled by the test 3D map, such output being based on analysis of the set of 2D images corresponding to collective volumes of the view frustums of the plurality of virtual camera views. In this example and/or other examples, inconsistencies detected by the 3D map inconsistency detection machine may include one or more of outdated geometry, gaps in reconstruction, and incorrectly connected components.

In another example a computing system, comprises a three-dimensional (3D) map inconsistency detection machine including 1) a first neural network configured to receive a test 3D map including 3D map data modeling a physical entity and output an inconsistency value indicating a degree to which the test 3D map includes inconsistencies based on analysis of the 3D map data, and 2) an input transformation layer connected to a second neural network, the input transformation layer being configured to convert the test 3D map data into a 3D point cloud, select a plurality of virtual camera views at different locations within the 3D point cloud, for each virtual camera view, subdivide a view frustum of the virtual camera view into a plurality of volumes, for each volume corresponding to the virtual camera view, render a 2D image of points of the 3D point cloud contained within the volume, and output a set of 2D images collectively corresponding to the volumes of the view frustums of the plurality of virtual camera views to the second neural network, and the second neural network is configured to output an inconsistency value indicating a degree to which the test 3D map includes inconsistencies based on analysis of the set of 2D images collectively corresponding to the volumes of the view frustums of the plurality of virtual camera views, and the first and second neural networks are connected to an output layer configured to determine a combined inconsistency value indicating a degree to which the test 3D map includes inconsistencies based on outputs of the first and second neural networks.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a three-dimensional (3D) map inconsistency detection machine including an input transformation layer connected to a neural network, the input transformation layer being executed by a computer and configured to:
receive a test 3D map including 3D map data modeling a physical entity, convert the test 3D map data into a 3D point cloud,
select a plurality of virtual camera views at different locations within the 3D point cloud,
for each virtual camera view, subdivide a view frustum of the virtual camera view into a plurality of volumes,
for each volume corresponding to the virtual camera view, render a 2D image of points of the 3D point cloud contained within the volume, and
output a set of 2D images collectively corresponding to the volumes of the view frustums of the plurality of virtual camera views to the neural network, and
wherein the neural network is configured to output an inconsistency value indicating a degree to which the test 3D map includes inconsistencies based on analysis of the set of 2D images collectively corresponding to the volumes of the view frustums of the plurality of virtual camera views.

2. The computing system of claim 1, wherein the 3D map data includes a sparse graph structure of observation nodes and geometry nodes connected via edges.

3. The computing system of claim 1, wherein the 3D map data includes inertial measurement unit (IMU) sensor data.

4. The computing system of claim 1, wherein the 3D map inconsistency detection machine is configured to output one or more locations on the test 3D map that are inconsistent with the physical entity modeled by the test 3D map, such output being based on analysis of the set of 2D images collectively corresponding to the volumes of the view frustums of the plurality of virtual camera views.

5. The computing system of claim 1, wherein inconsistencies detected by the 3D map inconsistency detection machine include one or more of outdated geometry, gaps in reconstruction, and incorrectly connected components.

6. The computing system of claim 1, wherein the neural network is previously trained with a set of labeled training 3D maps including 3D maps that are deformed, incomplete, or have corrupted data.

7. The computing system of claim 1, wherein the virtual camera views are positioned at equidistant locations across the 3D point cloud.

8. The computing system of claim 1, wherein 3D structures of the test 3D map are encoded into each of the 2D images using multiple image channels.

9. The computing system of claim 1, wherein 2D images that collectively correspond to the view frustum of each virtual camera view are output to the neural network in a same designated order on a per virtual camera view basis.

10. The computing system of claim 1,
wherein the neural network is a first neural network;
wherein the input transformation layer is a first input transformation layer;
wherein the 3D map inconsistency detection machine includes a second input transformation layer connected to a second neural network, the second input transformation layer being configured to generate an adjacency matrix from the 3D map data and provide the adjacency matrix as input to the second neural network;
wherein the second neural network is configured to output an inconsistency value indicating a degree to which the test 3D map includes inconsistencies based on analysis of the adjacency matrix; and
wherein the first neural network and the second neural network are connected to an output layer configured to determine a combined inconsistency value indicating a degree to which the test 3D map includes inconsistencies based on outputs of the first and second neural networks.

11. The computing system of claim 1,
wherein the neural network is a first neural network;
wherein the 3D map inconsistency detection machine includes a second neural network configured to receive the 3D map data, and output an inconsistency value indicating a degree to which the test 3D map includes inconsistencies based on analysis of the 3D map data; and
wherein the first neural network and the second neural network are connected to an output layer configured to determine a combined inconsistency value indicating a degree to which the test 3D map includes inconsistencies based on outputs of the first neural network and the second neural network.

12. The computing system of claim 11, wherein the second neural network is trained using a set of training data including 3D graphs having a bi-partite structure including a set of observation nodes and geometry nodes per partition.

13. A three-dimensional (3D) map inconsistency detection method performed by a computer, comprising:
receiving a test 3D map including 3D map data modeling a physical entity;
converting the test 3D map data into a 3D point cloud;
selecting a plurality of virtual camera views at different locations within the 3D point cloud;
for each virtual camera view, subdividing a view frustum of the virtual camera view into a plurality of volumes;
for each volume corresponding to the virtual camera view, rendering a 2D image of points in the 3D point cloud contained within the volume;
generating a set of 2D images collectively corresponding to the volumes of the view frustums of the plurality of virtual camera views; and
providing the set of 2D images as input to a neural network configured to output an inconsistency value indicating a degree to which the test 3D map includes inconsistencies based on analysis of the set of 2D images collectively corresponding to the volumes of the view frustums of the plurality of virtual camera views.

14. The method of claim 13, wherein the neural network is a first neural network and wherein the method further comprises
generating an adjacency matrix from the 3D map data;
providing the adjacency matrix as input to a second neural network configured to output an inconsistency value indicating a degree to which the test 3D map includes inconsistencies based on the adjacency matrix; and
determining a combined inconsistency value indicating a degree to which the test 3D map includes inconsistencies based on outputs of the first and second neural networks.

15. The method of claim 13, wherein the neural network is a first neural network and wherein the method further comprises
providing the 3D map data of the test 3D map as input to a second neural network configured to output an inconsistency value indicating a degree to which the test 3D map includes inconsistencies based on analysis of the 3D map data; and
determining a combined inconsistency value indicating a degree to which the test 3D map includes inconsistencies based on outputs of the first and second neural networks.

16. The method of claim 13, wherein the 3D map data includes a sparse graph structure of observation nodes and geometry nodes connected via edges and inertial measurement unit (IMU) sensor data.

17. The method of claim 13, wherein the virtual camera views are positioned at equidistant locations across the 3D point cloud.

18. The method of claim 13, wherein the 3D map inconsistency detection machine is configured to output one or more locations on the test 3D map that are inconsistent with the physical entity modeled by the test 3D map, such output being based on analysis of the set of 2D images corresponding to collective volumes of the view frustums of the plurality of virtual camera views.

19. The method of claim 13, wherein inconsistencies detected by the 3D map inconsistency detection machine include one or more of outdated geometry, gaps in reconstruction, and incorrectly connected components.

20. A computing system, comprising:
a three-dimensional (3D) map inconsistency detection machine including 1) a first neural network configured to receive a test 3D map including 3D map data modeling a physical entity and output an inconsistency value indicating a degree to which the test 3D map includes inconsistencies based on analysis of the 3D map data, and 2) an input transformation layer connected to a second neural network, the input transformation layer being executed by a computer and configured to:
convert the test 3D map data into a 3D point cloud,
select a plurality of virtual camera views at different locations within the 3D point cloud,
for each virtual camera view, subdivide a view frustum of the virtual camera view into a plurality of volumes,
for each volume corresponding to the virtual camera view, render a 2D image of points of the 3D point cloud contained within the volume, and
output a set of 2D images collectively corresponding to the volumes of the view frustums of the plurality of virtual camera views to the second neural network, and
wherein the second neural network is configured to output an inconsistency value indicating a degree to which the test 3D map includes inconsistencies based on analysis of the set of 2D images collectively corresponding to the volumes of the view frustums of the plurality of virtual camera views, and wherein the first and second neural networks are connected to an output layer configured to determine a combined inconsistency value indicating a degree to which the test 3D map includes inconsistencies based on outputs of the first and second neural networks.

\* \* \* \* \*